United States Patent Office 3,009,898
Patented Nov. 21, 1961

3,009,898
MIXTURE COMPRISING A POLYETHER POLY-
EPOXIDE, A POLYCARBOXYLIC ACID, AND
STYRENE OR DIALLYL PHTHALATE, AND PRO-
DUCTION OF HARDENED RESIN THEREFROM
Ferdinand Meyer, Mannheim, and Kurt Demmler, Heidel-
berg, Germany, assignors to Badische Anilin- & Soda-
Fabrik Aktiengesellschaft, Ludwigshafen (Rhine), Ger-
many
No Drawing. Filed July 11, 1955, Ser. No. 521,359
Claims priority, application Germany July 14, 1954
13 Claims. (Cl. 260—45.5)

This invention relates to mixtures which are capable of being hardened to plastics and to a process for hardening such mixtures.

We have found that mixtures of (a) compounds having on an average more than one epoxy group in the molecule, (b) olefinically unsaturated, polymerizable compounds containing no epoxy groups, (c) polycarboxylic acids or their anhydrides, and if desired (d) polymerization catalysts or accelerators are capable of being hardened to plastics with excellent properties.

Especially suitable compounds of class (a), i.e. compounds having on an average more than one epoxy group in the molecule, are for example the reaction products of polyhydric phenols, as for example of 4.4'-dihydroxy-diphenyldimethylmethane, with epichlorhydrin which are obtainable by conventional methods by heating the initial compounds in the presence of bases, and also glycidyl ethers of polyhydric alcohols, as for example from glycerine, butane triol, ethylene glycol or butanol and epichlohydrin, the production of which by reaction of the components in the presence of acid, for example Friedel-Crafts catalysts to form the chlorhydrin ethers and subsequent splitting off of hydrogen halide is also known. Mixtures of these compounds can also be used.

To the compounds of class (b), i.e. olefinically unsaturated polymerizable compounds, there belong the vinyl compounds and especially olefinically unsaturated hydrocarbons, as for example styrene or substituted styrenes, and also esters of unsaturated alcohols or unsaturated acids, which contain no epoxy groups, as for example diallyl phthalate or acrylic acid esters.

The polycarboxylic acids of class (c) may be saturated or unsaturated. Suitable polycarboxylic acids are for example phthalic or maleic acid or their anhydrides.

Compounds which accelerate the hardening (class (d)), as for example dicyandiamide, may also be used together with the carboxylic acids. Suitable polymerization catalysts (class (d)) are for example peroxidic compounds, as for example di-tertiary-butyl peroxide, benzoyl peroxide or cyclohexanone peroxide, and suitable accelerators are for example cobalt naphthenate and the like.

The components are preferably mixed while hot until a solution is formed which is usually clear. This can be poured into moulds and hardened by heating, preferably at temperatures between about 90° and 220° C. It is often of advantage to shorten the hardening time by adding polymerization catalysts and accelerators. Depending on the initial materials chosen, it is possible in this way to obtain glass-clear, flexible to hard plastics. They are characterized by clearness, high gloss, stability to chemical reagents and slight shrinkage and they adhere very firmly to a great variety of materials. The moulds are preferably brushed with silicone grease or other conventional mould lubricating agents before the resin solution is introduced in order that the castings may be removed from the mould more easily.

The epoxy compounds and the olefinically unsaturated polymerizable compounds can be used in a wide range of relative proportions. The proportion of the epoxy compound can amount to between 10 and 90 percent. It is advantageous for there to be two carboxylic groups for each epoxy group, but good results are also obtained when smaller amounts of polycarboxylic acids are used.

The mixtures prepared according to this invention or the plastics prepared therefrom are also suitable for the production of putties, lacquers and adhesives.

The following examples will further illustrate this invention but the invention is not restricted to these examples. The parts are parts by weight.

Example 1

From 1 mol of 4.4'-dihydroxydiphenyldimethylmethane and 2 mols of epichlorhydrin in the presence of caustic soda solution there is prepared by conventional methods a solid epoxy resin with an epoxy number of 0.25. The epoxy number is the number of gram-mols of epoxy groups in 100 grams of the epoxy resin. 100 parts of this resin are mixed with 30 parts of phthalic anhydride and 50 parts of styrene. After adding 2 parts of di-tertiary-butyl peroxide, the mixture hardens at 130° C. in 4 hours to a clear, very hard plastic which is very resistant to acids and alkalies.

By the use of diallyl phthalate instead of styrene, plastics with similar properties are obtained under the same conditions.

Example 2

50 parts of diallyl phthalate and 90 parts of phthalic anhydride are dissolved at about 50° to 70° C. in 100 parts of a liquid polyglycidyl ether having an epoxy number of 0.7 prepared from glycerine and epichlorhydrin. After adding 1 to 2 parts of di-tertiary-butyl peroxide, the mixture hardens in 1 to 2 hours at 130° C. to a clear, colorless, hard plastic with very good stability to chemical reagents.

Example 3

100 parts of the polyglycidyl ether specified in Example 2, 50 parts of phthalic anhydride and 50 parts of diallyl phthalate are mixed with each other at about 50° to 70° C. until a solution has been formed. After adding 1 to 2 parts of di-tertiary-butyl peroxide, a clear, flexible plastic is obtained with good stability to water, solvents and other chemical reagents.

Example 4

50 parts of an epoxy resin from 4.4'-dihydroxydiphenyldimethylmethane and epichlorhydrin, having an epoxy number of 0.25, 50 parts of the glycidyl ether specified in Example 2, 60 parts of phthalic anhydride and 50 parts of diallyl phthalate are mixed with each other while hot. The mixture is then heated for several hours at 170° C. in a mould. Clear, very hard castings are obtained which are stable to chemical reagents.

We claim:

1. A process for the production of resinified reaction products which comprises heating together a mixture of an epoxy resin, diallyl phthalate, and an epoxy curing agent selected from the group consisting of phthalic acid and phthalic anhydride, the epoxy resin containing no aliphatic carbon-to-carbon unsaturation and having a 1,2-epoxy equivalency greater than one, and being the reaction product of epichlorhydrin and a member of the group consisting of polyhydric phenols and polyhydric alcohols, the amount of epoxy resin present by weight being at least equal to the amount of diallyl phthalate in the mixture.

2. The process for the production of resinified reaction products which consists of heating together (1) a polyether polyepoxide having a 1,2-epoxy equivalency greater than 1 and containing no aliphatic carbon-to-carbon unsaturation, (2) styrene, and (3) a component of the group consisting of polycarboxylic acids and anhydrides which contain no aliphatic carbon-to-carbon unsaturation, said component being in an amount greater than 15% by weight based on the weight of the mixture of polyether polyepoxide and styrene.

3. The product produced by the process of claim 2.

4. The process for production of resinified reaction products which comprises heating a mixture containing compounds capable of being hardened into resins and consisting essentially of (1) a polyether polyepoxide having a 1,2-epoxy equivalency greater than 1 and containing no aliphatic carbon-to-carbon unsaturation, (2) an olefinically-unsaturated compound selected from the group consisting of styrene and diallyl phthalate, and (3) a component from the group consisting of polycarboxylic acids and anhydrides which contain no aliphatic carbon-to-carbon unsaturation, said polyepoxide constituting 10% to 90% by weight of the weight of said polyepoxide and said olefinically-unsaturated compound, and said component being in an amount sufficient to provide up to at least about two carboxy equivalents per epoxy group in said polyepoxide.

5. A mixture capable of being hardened upon heating consisting essentially of (1) a polyether polyepoxide having a 1,2-epoxy equivalency greater than 1 and containing no aliphatic carbon-to-carbon unsaturation, (2) an olefinically-unsaturated compound selected from the group consisting of styrene and diallyl phthalate, and (3) a component from the group consisting of polycarboxylic acids and anhydrides which contain no aliphatic carbon-to-carbon unsaturation, said polyepoxide constituting 10% to 90% by weight of the weight of said polyepoxide and said olefinically-unsaturated compound, and said component being in an amount sufficient to provide up to at least about two carboxy equivalents per epoxy group in said polyepoxide.

6. The mixture of claim 5 wherein said polyepoxide is a polyglycidyl ether formed from a polyhydric phenol and epichlorohydrin, said olefinically-unsaturated compound is styrene, and said component is phthalic anhydride.

7. The mixture of claim 6 wherein said polyhydric phenol is a 4,4'-dihydroxy-diphenyl-alkane.

8. The mixture of claim 5 wherein said polyepoxide is a polyglycidyl ether formed from a polyhydric phenol and epichlorohydrin, said olefinically-unsaturated compound is diallyl phthalate, and said component is phthalic anhydride.

9. The mixture of claim 5 wherein said polyepoxide is a polyglycidyl ether formed from a polyhydric phenol and epichlorohydrin, said olefinically-unsaturated compound is styrene, and said component is phthalic acid.

10. The mixture of claim 5 wherein said polyepoxide is a polyglycidyl ether formed from a polyhydric aliphatic alcohol and epichlorohydrin, said olefinically-unsaturated compound is styrene, and said component is phthalic anhydride.

11. The mixture of claim 10 wherein said alcohol is glycerine.

12. The mixture of claim 5 wherein said polyepoxide is a polyglycidyl ether formed from a polyhydric aliphatic alcohol and epichlorohydrin, said olefinically-unsaturated compound is diallyl phthalate, and said component is phthalic anhydride.

13. A hardened resin produced by heating the mixture of claim 5.

References Cited in the file of this patent

UNITED STATES PATENTS

| 2,707,177 | Skiff et al. | Apr. 26, 1955 |
| 2,848,433 | Eirich | Aug. 19, 1958 |

FOREIGN PATENTS

| 1,083,180 | France | June 23, 1954 |

OTHER REFERENCES

Marmion: "Epoxide Resins," Research (London), volume 7, 1954, pages 351–352.

"Epon Resins," Techn. Public. SC: 52–31, Shell Chem. Corp., November 1952, pages 17, 20.